UNITED STATES PATENT OFFICE.

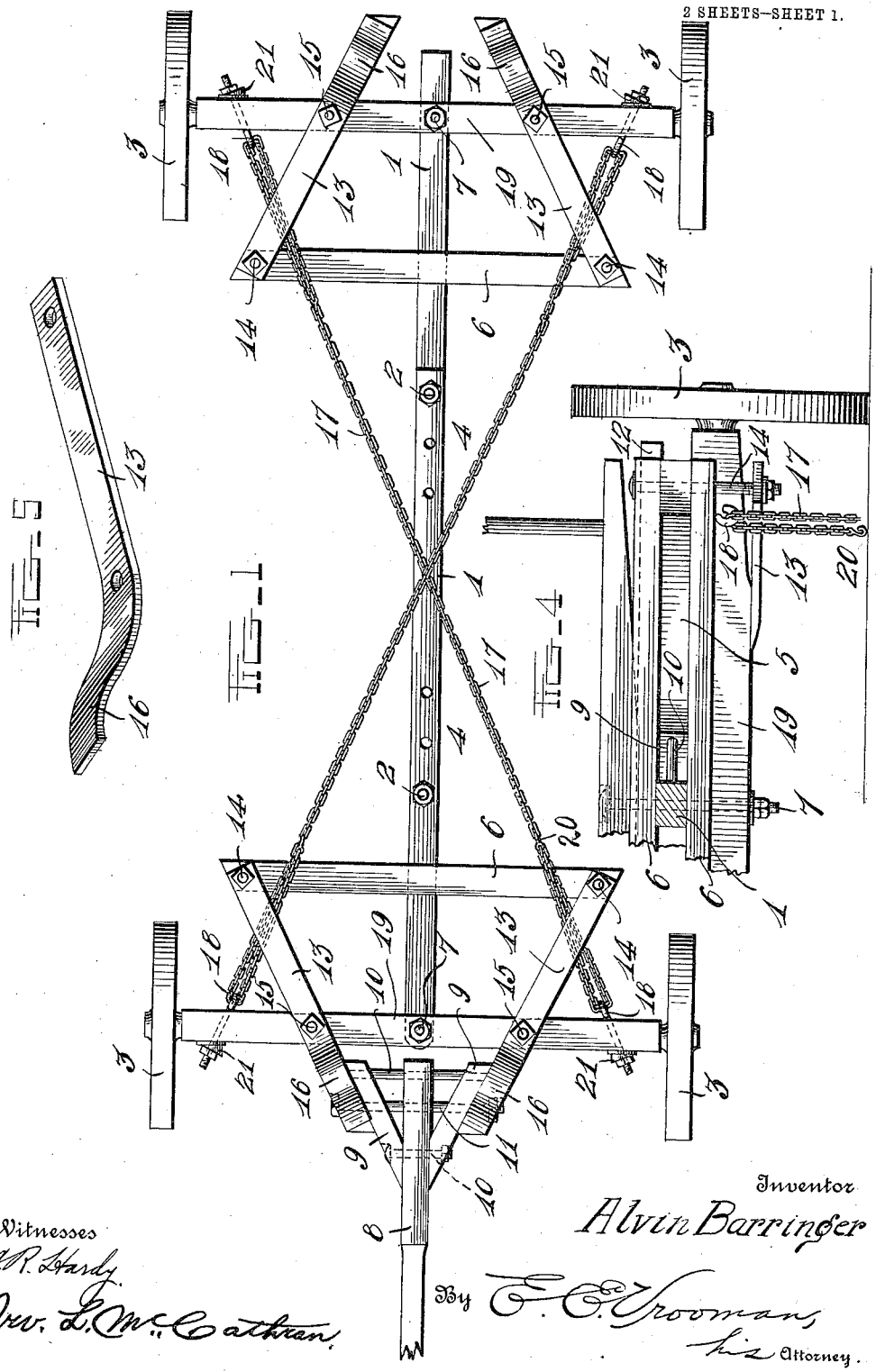

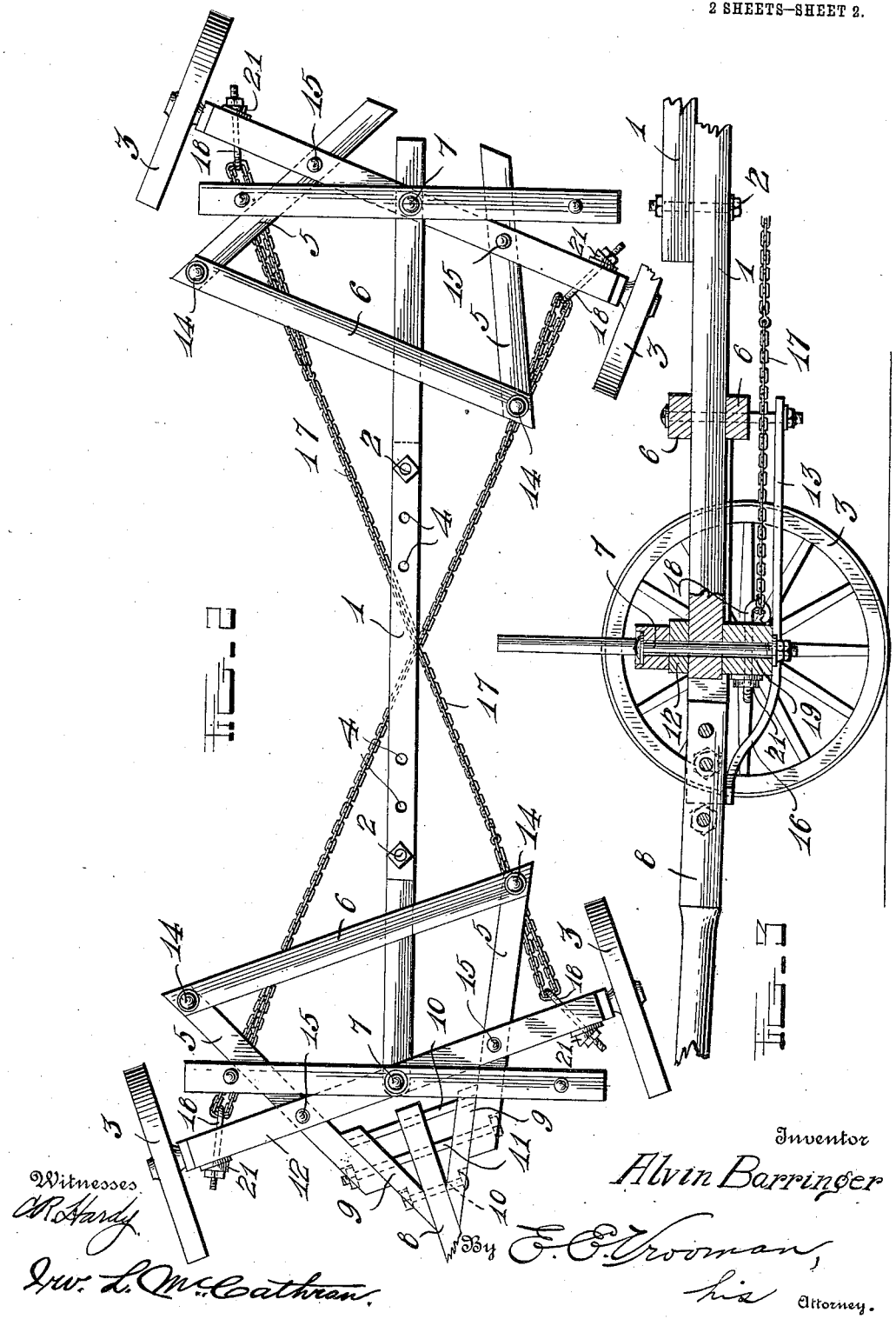

ALVIN BARRINGER, OF WALTON, NEW YORK.

LUMBER-WAGON.

1,044,849.	Specification of Letters Patent.	Patented Nov. 19, 1912.

Application filed December 19, 1911. Serial No. 666,752.

*To all whom it may concern:*

Be it known that I, ALVIN BARRINGER, a citizen of the United States, residing at Walton, in the county of Delaware and State of New York, have invented certain new and useful Improvements in Lumber-Wagons, of which the following is a specification, reference being had therein to the accompanying drawing.

This invention relates to lumber wagons, and has for its object the production of a wagon whereby the same will be enabled to make sharp turns.

Another object of this invention is the production of an efficient brace means for the trucks of the wagon, and has especially for its object the production of an efficient bracing strap which is adapted to engage the front end of the truck for reinforcing the same at the junction of the tongue with the truck.

With these and other objects in view this invention consists of certain novel constructions, combinations, and arrangements of parts, as will be hereinafter fully described and claimed.

In the drawings, Figure 1 is a bottom plan view of the vehicle. Fig. 2 is a top plan view thereof showing the position of the trucks when making a turn. Fig. 3 is a fragmentary longitudinal section of the front truck. Fig. 4 is a transverse section taken through the central brace member showing a portion of the rear truck in front elevation. Fig. 5 is a detail perspective of the bracing strap carried upon the side of the truck frames.

Referring to the drawings by numerals 1 designates the central beam which is preferably formed of two sections being connected together by means of bolts 2. The outer ends of this beam are engaged by the trucks, which trucks are supported by means of wheels 3. The rear section of the central beam 1 is provided with a plurality of apertures 4 for allowing the wagon to be adjusted to accommodate different sized bodies which may be carried thereby.

The trucks above-mentioned comprise a substantially V-shaped frame consisting of a pair of side members 5 which members are connected at their rear ends by means of a pair of parallel members 6 which members straddle the side members 5. The parallel members 6 connecting the ends of the side members 5, extend across the central beam 1, and thereby assist in preventing the twisting of the frames upon the king-bolts 7.

The side members 5 of the front frame carry the tongue 8 between the outer ends thereof, which tongue comprises a pair of divergent arms 9 connected together by means of brace bolts 10. The tongue 8 and divergent arm 9 are connected to the side members 5 by means of a connecting bolt 11. Of course, the frames are connected or supported by means of bolsters 12, which bolsters carry the usual axles for supporting the wheels.

A strap member 13 is carried by the under side of each side member 5, this strap member has its rear end connected to the connecting bolt 14, which bolt also secures the ends of the members 6 to the rear end of the member 5. The strap 13 is connected intermediate its ends by means of a bolt 15, and the free end 16 of the strap 13 is bent upwardly engaging the forward end of the member 5. It will, therefore, be obvious that this brace member 13 will assist in bracing the outer ends of the members 5. The inner ends of the members 13 are spaced from the lower faces of the members 6 as indicated in Fig. 3 so as to form a guide way or channel for allowing the connecting chains 17 to have free movement between the side members 5 and the member 13. It will, also be obvious that these strap members will act as a shield for the chain at their inner ends.

Connecting bolts 18 are connected to the axles 19 and are positioned at an angle thereto. The chains 17 are connected to the bolts 18 upon opposite sides of the wagon so that these chains may cross near the center of the wagon for allowing the trucks to be so swung as to facilitate the turning thereof around a corner. The chains are provided at each end with a hook 20 which hook may be adjustably secured in the links of the chain thereby allowing the chain to be tightened in case the same should be sagged. These bolts 18 are held at an angle to the axle 19 by means of the pitched washers 21 as illustrated in Figs. 1 and 2.

From the foregoing description, it will be obvious that the chains 17 will be shielded from the wheels 3 in view of the fact that these chains will be held away from the wheels through the medium of the bolts 14 which engage the inner corners of the frame. It will also be obvious that these braces 13, through the medium of their inner ends 16 greatly reinforce the side members 5 of the front frame at the point where most of the strain and weight of the tongue occurs.

What is claimed is:—

A wagon frame of the class described comprising a forward truck and a rear truck, means for adjustably connecting the same, cross chains connecting said trucks, side members carried by said trucks, strap members carried by the lower faces of said side members and being spaced therefrom, said chains passing between said side members and brace members, bolts engaging the inner ends of said brace members and being adapted to hold said chains in engagement with said frame for shielding said chains from the wheels carried by said truck, and a tongue connected to the front truck.

In testimony whereof I hereunto affix my signature in presence of two witnesses.

ALVIN BARRINGER.

Witnesses:
WILLIAM E. HENDERSON,
WILLIAM R. RUYNOLDS.